US010711861B1

(12) United States Patent
Kasprzak et al.

(10) Patent No.: US 10,711,861 B1
(45) Date of Patent: Jul. 14, 2020

(54) CONTROLLABLE OLEO-PNEUMATIC DAMPER USING MAGNETORHEOLOGICAL FLUID

(71) Applicants: Jan Michael Kasprzak, Lexington Park, MD (US); Mursleen Mumtaz, Waldorf, MD (US); Pakky Ngaha, Lexington Park, MD (US); Joseph Hodkiewicz, Great Mills, MD (US); Mark Glucksman-Glaser, Great Mills, MD (US); Nicholaos Sofocleous, Lexington Park, MD (US)

(72) Inventors: Jan Michael Kasprzak, Lexington Park, MD (US); Mursleen Mumtaz, Waldorf, MD (US); Pakky Ngaha, Lexington Park, MD (US); Joseph Hodkiewicz, Great Mills, MD (US); Mark Glucksman-Glaser, Great Mills, MD (US); Nicholaos Sofocleous, Lexington Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/357,560

(22) Filed: Mar. 19, 2019

(51) Int. Cl.
| *F16F 9/53* | (2006.01) |
| *F16F 9/06* | (2006.01) |
| *B64C 25/62* | (2006.01) |
| *F16F 9/02* | (2006.01) |
| *F16F 9/36* | (2006.01) |
| *B64C 25/60* | (2006.01) |
| *F16F 9/34* | (2006.01) |

(52) U.S. Cl.
CPC .............. *F16F 9/535* (2013.01); *B64C 25/60* (2013.01); *B64C 25/62* (2013.01); *F16F 9/029* (2013.01); *F16F 9/061* (2013.01); *F16F 9/063* (2013.01); *F16F 9/065* (2013.01); *F16F 9/34* (2013.01); *F16F 9/368* (2013.01); *F16F 2222/12* (2013.01); *F16F 2224/045* (2013.01); *F16F 2228/066* (2013.01)

(58) Field of Classification Search
CPC .. F16F 9/063; F16F 9/061; F16F 9/535; F16F 9/34; F16F 9/368; F16F 2222/12; F16F 2224/045; F16F 2228/066; B64C 25/60; B64C 25/62
See application file for complete search history.

(56) References Cited

U.S. PATENT DOCUMENTS

| 2,667,237 A | | 1/1954 | Rabinow | |
| 3,653,682 A | * | 4/1972 | Palmer | ................... B60G 13/06 280/124.128 |

(Continued)

FOREIGN PATENT DOCUMENTS

| DE | 19883800678 | 7/1989 |
| WO | 20040061328 | 7/2004 |

*Primary Examiner* — Thomas J Williams
*Assistant Examiner* — James K Hsiao
(74) *Attorney, Agent, or Firm* — Mark O. Glut; Nawcad

(57) ABSTRACT

The invention is a damper that includes a hollow cylindrical housing, a hollow cylindrical piston, an annular electromagnetic orifice, a bulkhead, a chemically inert charging gas, a cylindrical metering pin, and a controller. The damper is an oleo-pneumatic damper using magnetorheological fluid that allows active damper control.

1 Claim, 3 Drawing Sheets

(56) References Cited

U.S. PATENT DOCUMENTS

| | | | |
|---|---|---|---|
| 4,452,437 A * | 6/1984 | Lochner | B60R 19/54 267/64.22 |
| 5,277,281 A | 1/1994 | Carlson et al. | |
| 5,878,851 A * | 3/1999 | Carlson | F16F 9/067 188/267 |
| 5,996,979 A * | 12/1999 | Hrusch | F16F 9/512 188/282.1 |
| 6,019,201 A * | 2/2000 | Gordaninejad | F16F 9/535 188/267.1 |
| 6,131,709 A * | 10/2000 | Jolly | F16F 9/20 137/909 |
| 6,279,702 B1 * | 8/2001 | Koh | F16F 9/062 188/267.2 |
| 6,378,671 B1 * | 4/2002 | Carlson | B62D 5/006 188/267.2 |
| 6,382,369 B1 * | 5/2002 | Lisenker | F16F 9/535 188/267 |
| 6,612,409 B2 * | 9/2003 | Lun | F16F 9/535 188/267.2 |
| 6,676,076 B1 * | 1/2004 | Davies | B64C 25/60 188/314 |
| 6,860,371 B2 * | 3/2005 | Ananthanarayanan | B23K 11/002 188/267 |
| 7,036,612 B1 * | 5/2006 | Raymond | E21B 17/07 175/320 |
| 8,322,497 B2 * | 12/2012 | Marjoram | B60G 99/002 188/267 |
| 8,506,837 B2 * | 8/2013 | Ocalan | H01F 1/447 252/62.56 |
| 9,186,951 B2 * | 11/2015 | Soles | F16F 9/535 |
| 2002/0171067 A1 * | 11/2002 | Jolly | C10M 171/001 252/570 |
| 2005/0016802 A1 * | 1/2005 | Akami | F16F 15/035 188/267 |
| 2007/0017758 A1 * | 1/2007 | Or | F16F 9/535 188/267.2 |
| 2007/0023244 A1 * | 2/2007 | Carlson | B60N 2/522 188/267 |
| 2007/0023245 A1 * | 2/2007 | Lau | F16F 9/535 188/267.2 |
| 2008/0023278 A1 * | 1/2008 | Wereley | F16F 9/3415 188/267.2 |
| 2010/0181423 A1 * | 7/2010 | Martin | B64C 25/60 244/104 FP |
| 2014/0152066 A1 * | 6/2014 | Hiemenz | F16F 9/12 297/344.1 |
| 2015/0041263 A1 * | 2/2015 | Saito | F16F 9/535 188/267.2 |
| 2016/0298714 A1 * | 10/2016 | Schmidt | B64C 25/60 |
| 2018/0057154 A1 * | 3/2018 | Schmidt | F16F 9/3242 |

* cited by examiner

CONTROLLABLE OLEO-PNEUMATIC DAMPER USING MAGNETORHEOLOGICAL FLUID

STATEMENT OF GOVERNMENT INTEREST

The invention described herein may be manufactured and used by or for the Government of the United States of America for governmental purposes without payment of any royalties thereon or therefor.

BACKGROUND

An oleo-pneumatic device or damper absorbs shock through a combination of forcing oil through an orifice and compressing air or another gas. Magnetorheological (MR) fluid is a type of smart fluid that includes microscopic iron particles suspended in a carrier fluid, usually a type of oil. When subjected to a magnetic field, the fluid greatly increases its apparent viscosity, to the point of becoming a viscoelastic solid.

Dampers using MR valves were originally developed to be oleo systems (as opposed to oleo-pneumatic systems), with automobile shock absorbers being a key application. A MR valve comprises an electromagnet that is installed inside of a casing. The casing is usually made from a magnetic alloy, and forms an orifice or annulus within the damper. The MR fluid flows through the orifice or annulus as the damper is compressed or extended. The electromagnet generates a magnetic field that the casing directs perpendicularly through the fluid to an outer casing, which is also typically constructed out of a magnetic alloy. The strength of the magnetic field may be controlled to modify the behavior of the fluid, and therefore the damper, as needed for a particular application or operating environment. Most MR valves use an orifice/annulus that is fixed in size, with the electromagnet located internal to the flow of fluid. A typical MR valve design is therefore not practical to retrofit into existing aircraft landing gear, because of the presence of metering pins in most oleo-pneumatic landing struts. Further, the use of a traditional MR valve would limit the design space for a new MR landing gear design, particularly if it were to be oleo-pneumatic.

SUMMARY

The present invention is directed to a damper that meets the needs listed above and below.

It is a feature of the present invention to provide, but without limitation, an oleo- pneumatic damper using magnetorheological fluid that is a controllable shock-strut for aircraft landing gear applications.

It is a feature of the present invention to provide an oleo-pneumatic damper using magnetorheological fluid that allows active damper control.

DRAWINGS

These and other features, aspects and advantages of the present invention will become better understood with reference to the following description and appended claims, and accompanying drawings wherein:

DESCRIPTION

Figure 1:
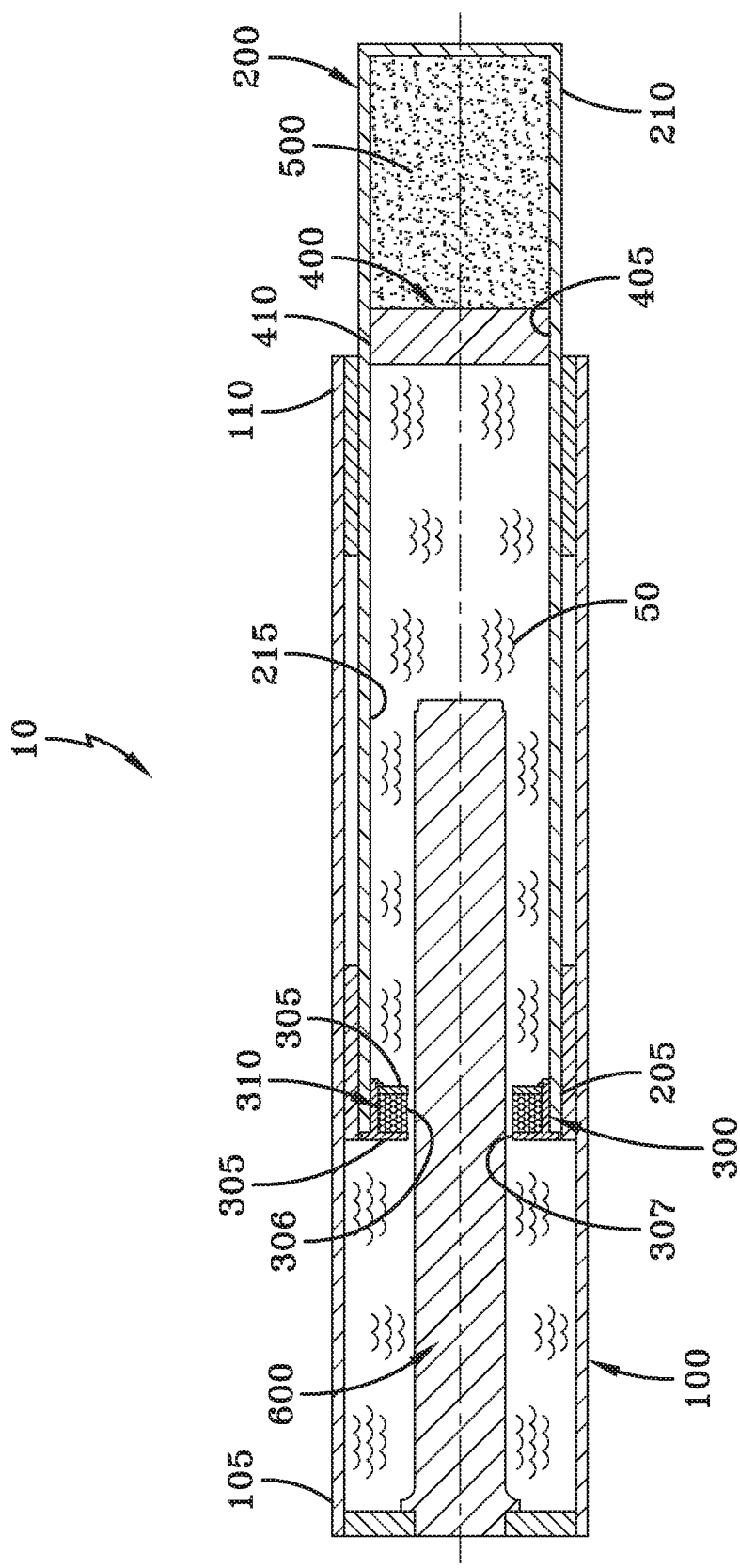
FIG. 1 is a side cross-sectional view of an embodiment of the oleo-pneumatic damper.
Figure 2:
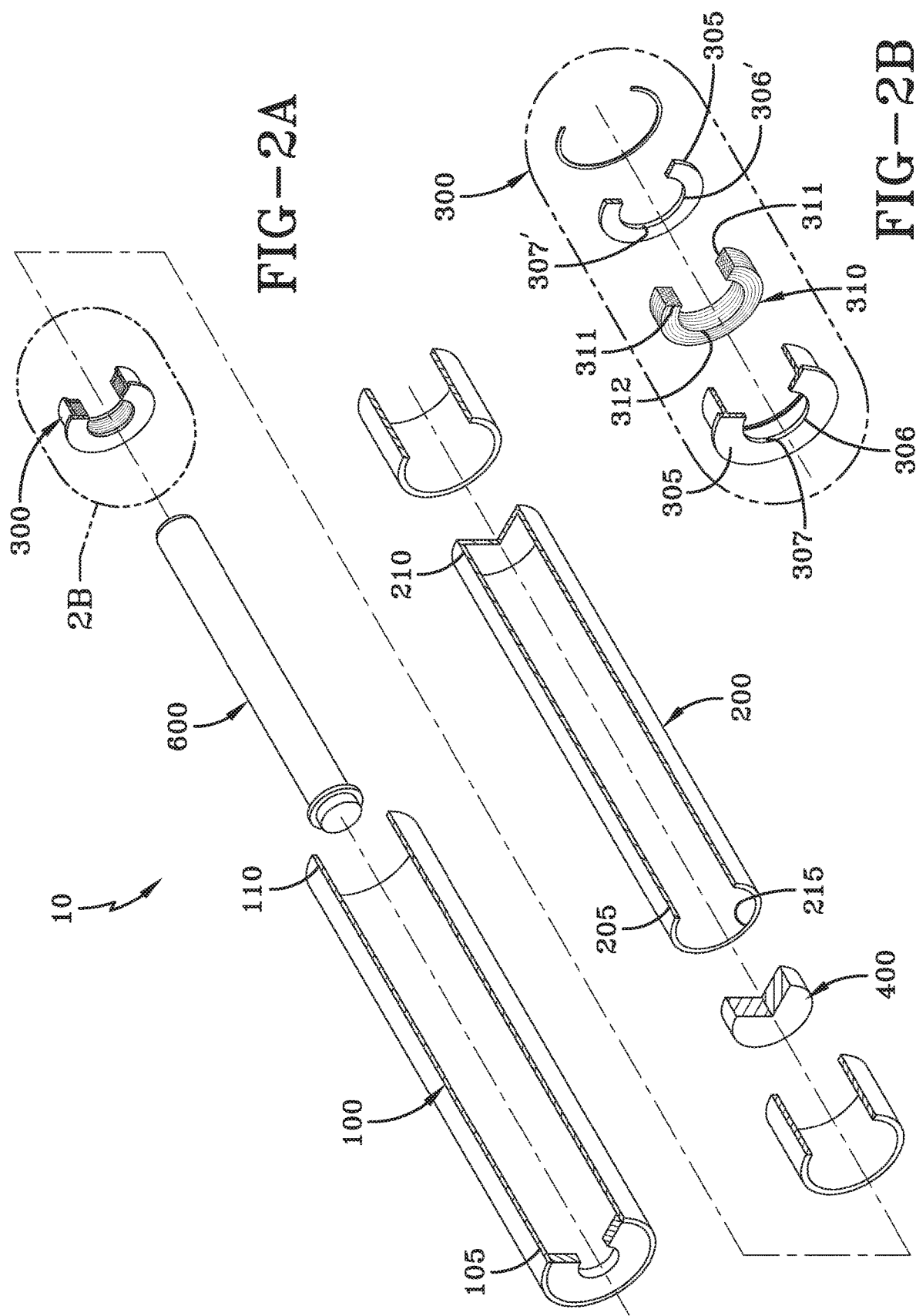
FIG. 2A is an exploded perspective view of an embodiment of the oleo-pneumatic damper.
FIG. 2B is an exploded perspective view of an embodiment of the assembly of the annular electromagnetic orifice; and, FIG. 3 is a schematic depicting the controller.
Figure 3:
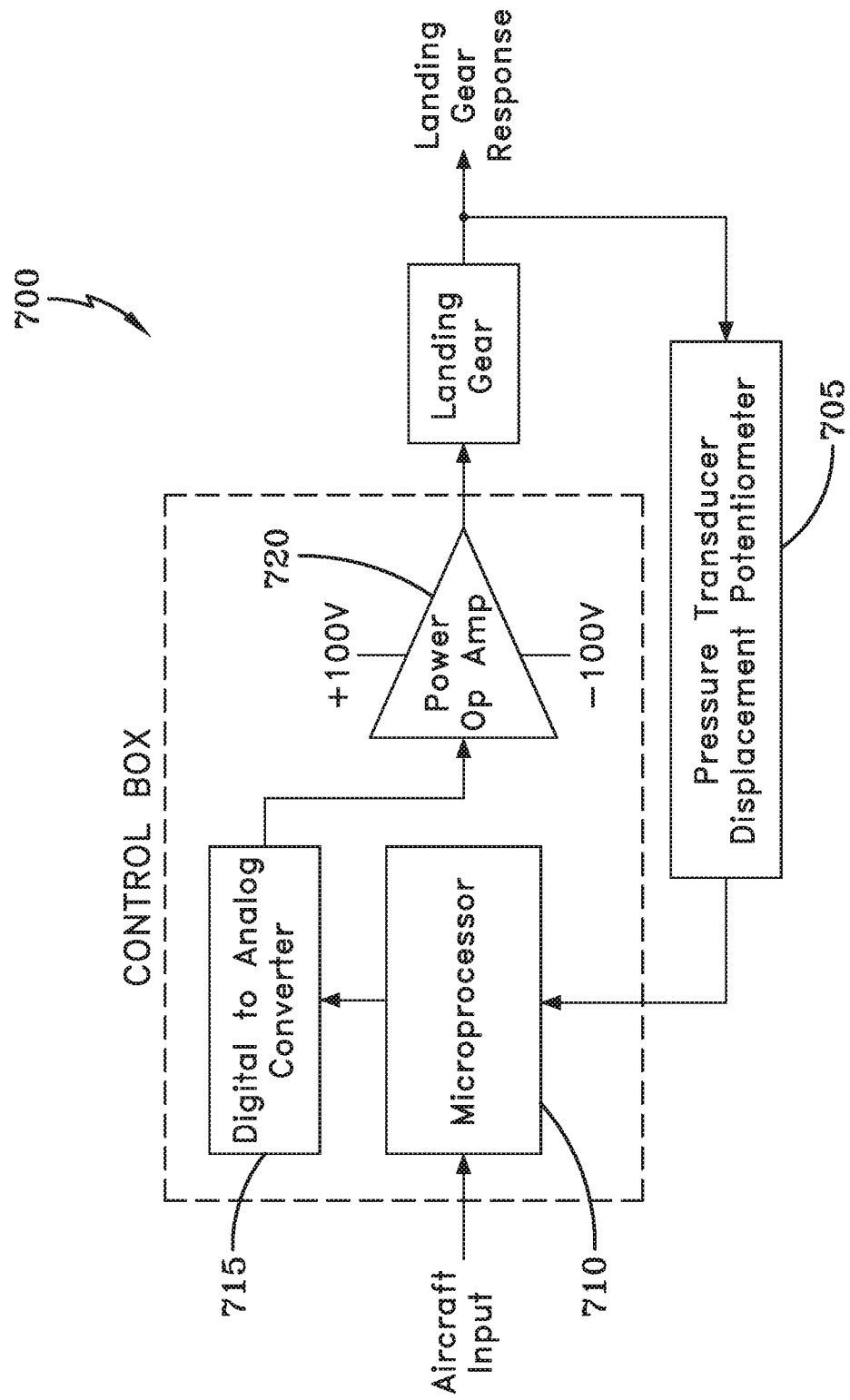

The preferred embodiments of the present invention are illustrated by way of example below and as shown in FIGS. 1, 2A, 2B, and 3. As shown in FIGS. 1, 2A, and 2B, the oleo-pneumatic damper 10 using magnetorheological (MR) fluid 50 has a controllable load-stroke profile. The damper 10 includes a hollow cylindrical housing 100, a hollow cylindrical piston 200, an annular electromagnetic orifice 300, a bulkhead 400, a chemically inert charging gas 500, a cylindrical metering pin 600, and a controller 700 (shown in FIG. 3). The hollow cylindrical housing 100 has a first circular end 105 and second circular end 110. The hollow cylindrical piston 200 is disposed within and concentric to the housing 100, and the piston 200 has a first piston end 205, a second piston end 210, and a piston inner surface 215. The second piston end 210 is closed such that fluids may be contained within the piston 200. The annular electromagnetic orifice 300 is disposed at the first piston end 205, and the annular electromagnetic orifice 300 is concentric to the housing 100. As shown in FIG. 2B, the electromagnetic orifice 300 is formed by an orifice casing 305 and an annular electromagnet 310 that are concentric to each other. The annular electromagnet 310 is manufactured from wound conductive wire, and has three exterior facing sides 311 and an inner bore 312. The orifice casing 305 completely surrounds the exterior facing sides 311 of the annular electromagnet 310, and has circular lumen 306 on opposite sides of the annular electromagnet 310 that form a bore 307 that is flush with the inner bore 312. The orifice casing 305 is made, or at least partially made from a material with high magnetic permeability and a high magnetic flux density saturation point. The bulkhead 400 is disposed within the hollow cylindrical piston 200, and has a bulkhead outer diameter 405 and a sealing system 410 that forms a dynamic seal with the piston inner surface 215 such that a sliding barrier is formed in the piston 200. The magnetorheological fluid 50 is disposed between the bulk head 400 and the first circular end 105 of the cylindrical housing 100. A small amount of magnetorheological fluid 50 may also be present in the space between the outer diameter of the piston 200 and the inner diameter of the housing 100, and between the first piston end 205 and the second circular end 110, for the purposes of generating additional damping forces. The chemically inert charging gas 500 is disposed within the piston 200 between the closed second piston end 210 and the bulkhead 400. The dynamic seal forms a sliding barrier in the piston 200 to separate the magnetorheological fluid 50 from the charging gas 500. The cylindrical metering pin 600 is disposed within the housing 100 and the piston 200, and is concentric to the housing 100 and attached to the first circular end 105 of the housing 100. The metering pin 600 is surrounded by magnetorheological fluid 50 and is completely made or partially from a material with high magnetic permeability and a high magnetic flux density saturation point. The metering pin 600 extends through the inner bore 312 of the annular electromagnet 310 such that the flow of the magnetorheological fluid 50 is channeled between the metering pin 600 and the electromagnetic orifice 300 when magnetorheological fluid 50 is pushed by the piston 200. The metering pin 600 allows a magnetic circuit to be completed between the metering pin 600 and the orifice casing 305 when electrical power is applied to the annular electromagnet 310 such that magnetic field lines from the annular electromagnet 310 become locally oriented perpendicular to flow direction of the magnetorheological fluid 50. As shown in FIG. 3, the controller 700 includes sensors 705 that allow for passive, semi-active, or active control of the load-stroke profile for the damper 10 by adjusting damping characteristics of the damper 10 by changing the viscous properties of the magnetorheological fluid 50 with applied magnetic field.

In the description of the present invention, the invention will be discussed in a military landing gear aircraft environment; however, this invention can be utilized for any type of application that requires use of a damper.

In the preferred embodiment of the invention, the orifice casing 305 and the metering pin 600 are ferromagnetic. Particularly, the preferred materials are commonly available steel (for example, but without limitation, 1018 steel), substantially pure iron, and iron-cobalt alloys. The preferred annular electromagnet 310 is wound from a continuous piece of wire, whose leads are fed out of the top of the orifice casing 305. In another embodiment, multiple concentric electromagnets, connected either in series or in parallel, could perform better in certain applications. Thicker or thinner gauge wires might work better for different applications. In the preferred embodiment, the electromagnet 310 is positioned external to the fluid flow of the magnetorheological fluid 50, as opposed to internal to the flow as used in traditional MR valves.

The metering pin 600 may be, but without limitation, straight and untapered, or tapered or contoured along the length or parts of the length of metering pin 600. In the preferred embodiment, the metering pin is either a solid cylinder of ferromagnetic material, or a solid cylinder of a lighter structural material, such as aluminum, that is clad with enough ferromagnetic material to allow sufficient magnetic flow to pass through the metering pin 600. In an alternate embodiment of the invention, the metering pin 600 may be a hollow cylinder. This would allow a user to insert a cylindrical rod or pipe through the metering pin 600 (starting from the first circular housing end 105) that attaches to the bulkhead 400 for the purposes of adding charging gas 500 and/or metering the volume of MR fluid 50 within the damper 10.

In an alternate embodiment of the invention, a hollow cylindrical permanent magnet is included within the orifice casing 305, in addition to and concentric with the annular electromagnet 310, to provide a constant magnetic field to the annular electromagnetic orifice 300. The magnetic field from the permanent magnet can be controllably strengthened or weakened using the annular electromagnet 310 in order to provide an element of fail-safety to the MR damper 10 and/or to increase the controllable range of the magnetic field acting on the MR fluid 50.

Another alternate embodiment of the invention (not shown) includes one or more hollow cylindrical rings (referred to as "coil dividers") within and concentric to the orifice casing 305, and made from the same material as the orifice casing 305, that would divide the annular electromagnet 310 into two or more sections. The electromagnet sections, connected to each other in series or in parallel, would be wound in alternating directions, such that the magnetic fields from the sections would pass through a separating coil divider in the same direction, thus amplifying the net strength of the field instead of reducing it. The coil dividers would effectively provide additional material for the magnetic field to pass through which could be used to avoid saturation of one or more magnetic circuits in high energy applications.

In the preferred embodiment of the invention, the controller 700 utilizes aircraft data (such as, for example, without limitation, gross weight, sink speed, etc.) as input parameters to predict initial landing gear control parameters. The controller 700 would also use the aircraft inputs to determine the optimized load stroke profile for the landing gear. The controller utilizes sensors 705 to detect impact of the landing gear with the ground, and to perform closed-loop feedback control of load so that the damping response of the landing gear minimize loads transmitted to the airframe.

An example of a potential control system scheme is shown in FIG. 3. The controller 700 includes a microprocessor 710, a digital to analog converter 715, and a power operational amplifier 720. The microprocessor 710 would utilize pilot input, aircraft data, and landing gear sensors data. The digital to analog converter 715 would take a digital signal from the microprocessor 710 and convert it to an analog control signal that can be amplified. The power operational amplifier 720 would amplify the analog control signal into the voltage needed to generate sufficient current in the annular electromagnet 310 so that the load can be minimized on the aircraft. The controller 700 can be powered, but without limitation, by 28VDC, 115VAC aircraft power, or any other energy source.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. An oleo-pneumatic damper using magnetorheological fluid, the damper having a controllable load-stroke profile, the damper comprising:

a hollow cylindrical housing having a first circular end and a second circular end;

a hollow cylindrical piston disposed within and concentric to the hollow cylindrical housing, the hollow cylindrical piston having a first piston end, a second piston end, and a piston inner surface, the second piston end being closed such that fluids may be contained within the piston;

an annular electromagnetic orifice disposed at the first piston end, the electromagnetic orifice concentric to the hollow cylindrical housing, the electromagnetic orifice formed by an orifice casing and an annular electromagnet that are concentric to each other, the annular electromagnet having exterior facing sides and an inner bore and being made from wound conductive wire, the orifice casing completely surrounding the exterior facing sides of the annular electromagnet and having circular lumen that form a bore that is flush with the inner bore, the orifice casing being made from a material with high magnetic permeability and a high magnetic flux density saturation point;

a bulkhead disposed within the hollow cylindrical piston, the bulkhead having a bulkhead outer diameter and a sealing system that forms a dynamic seal with the piston inner surface such that a sliding barrier is formed in the hollow cylindrical piston, magnetorheological fluid disposed between the bulk head and the first circular end of the hollow cylindrical piston;

a chemically inert charging gas, disposed within the hollow cylindrical piston between the closed second piston end and the bulkhead, the dynamic seal forms the sliding barrier in the piston to separate the magnetorheological fluid from the charging gas;

a cylindrical metering pin disposed within the housing and the piston, the metering pin being concentric to the housing and attached to the first circular end of the housing, the metering pin being surrounded by magnetorheological fluid, the metering pin being made from a material with high magnetic permeability and a high magnetic flux density saturation point, the metering pin extending through the inner bore of the annular electromagnet such that the flow of the magnetorheological fluid is channeled between the metering pin and the electromagnetic orifice when magnetorheological fluid is pushed by the hollow cylindrical piston, the metering pin allows a magnetic circuit to be completed between the metering pin and the orifice casing when electrical power is applied to the annular electromagnet such that magnetic field lines from the electromagnet become locally oriented perpendicular to flow direction of the magnetorheological fluid; and, a controller, that includes sensors, that allows for passive, semi-active, or active control of the load-stroke profile for the damper by adjusting damping characteristics of the damper.

* * * * *